(12) United States Patent
Wall

(10) Patent No.: US 10,018,086 B2
(45) Date of Patent: Jul. 10, 2018

(54) FILTER

(71) Applicant: GE Jenbacher GmbH & Co OG, Jenbach (AT)

(72) Inventor: Guenther Wall, Bad Haering (AT)

(73) Assignee: GE JENBACHER GMBH & CO OG, Jenbach (CH)

( * ) Notice: Subject to any disclaimer, the term of this patent is extended or adjusted under 35 U.S.C. 154(b) by 277 days.

(21) Appl. No.: 14/837,715

(22) Filed: Aug. 27, 2015

(65) Prior Publication Data

US 2016/0076418 A1     Mar. 17, 2016

(30) Foreign Application Priority Data

Sep. 15, 2014  (AT) ............................. A 50646/2014

(51) Int. Cl.
   *F01M 13/04*    (2006.01)
   *B01D 46/00*    (2006.01)

(52) U.S. Cl.
   CPC ......... *F01M 13/04* (2013.01); *B01D 46/0023* (2013.01); *B01D 46/0031* (2013.01); *F01M 2013/0438* (2013.01)

(58) Field of Classification Search
   None
   See application file for complete search history.

(56) References Cited

U.S. PATENT DOCUMENTS

| | | | |
|---|---|---|---|
| 3,910,252 A * | 10/1975 | Richard | .................... F24B 1/18  126/500 |
| 4,102,736 A | 7/1978 | Head et al. | |
| 4,102,785 A | 7/1978 | Head et al. | |
| 4,160,684 A * | 7/1979 | Berger, Jr. | ........... B01D 17/045  156/292 |
| 4,676,807 A * | 6/1987 | Miller | ................ B01D 39/1623  55/487 |
| 4,759,782 A | 7/1988 | Miller et al. | |
| 5,129,923 A | 7/1992 | Hunter et al. | |
| 5,725,621 A | 3/1998 | Pruette et al. | |
| 5,961,678 A * | 10/1999 | Pruette | ............... B01D 46/0005  210/448 |

(Continued)

FOREIGN PATENT DOCUMENTS

AT      512 506       9/2013
DE    26 45 634      11/1977

(Continued)

OTHER PUBLICATIONS

European Search Report dated Mar. 1, 2016 in corresponding European Application No. 15002504 (with English translation).

(Continued)

*Primary Examiner* — Amber R Orlando
*Assistant Examiner* — Britanny Precht
(74) *Attorney, Agent, or Firm* — GE Global Patent Operation; Rita D. Vacca

(57) ABSTRACT

A filter for an internal combustion engine is used to separate liquid suspended particles from a gas discharged from a crankcase of the internal combustion engine to avoid a rise in engine crankcase pressure. The filter includes at least one filter portion for coarse separation, at least one filter portion for fine separation, and at least one drainage layer arranged within the at least one filter portion for fine separation.

13 Claims, 3 Drawing Sheets

(56) References Cited

U.S. PATENT DOCUMENTS

| | | | |
|---|---|---|---|
| 6,047,670 A | 4/2000 | Stella et al. | |
| 6,419,721 B1 * | 7/2002 | Hunter | B01D 39/163 55/356 |
| 7,309,372 B2 | 12/2007 | Kahlbaugh et al. | |
| 7,314,497 B2 | 1/2008 | Kahlbaugh et al. | |
| 7,416,576 B2 * | 8/2008 | Ziebold | B01D 46/0031 55/423 |
| 8,021,455 B2 | 9/2011 | Adamek et al. | |
| 8,057,567 B2 | 11/2011 | Webb et al. | |
| 8,177,875 B2 | 5/2012 | Rogers et al. | |
| 8,268,033 B2 | 9/2012 | Rogers et al. | |
| 8,277,529 B2 | 10/2012 | Rogers et al. | |
| 8,360,251 B2 * | 1/2013 | Wieczorek | B01D 17/045 210/307 |
| 8,460,424 B2 | 6/2013 | Rogers et al. | |
| 8,512,435 B2 | 8/2013 | Rogers et al. | |
| 8,641,796 B2 | 2/2014 | Rogers et al. | |
| 2004/0194439 A1 * | 10/2004 | Tang | B01D 46/24 55/484 |
| 2006/0096263 A1 | 5/2006 | Kahlbaugh et al. | |
| 2006/0242933 A1 | 11/2006 | Webb et al. | |
| 2007/0039300 A1 | 2/2007 | Kahlbaugh et al. | |
| 2007/0175191 A1 * | 8/2007 | Ziebold | B01D 46/0031 55/482 |
| 2008/0245037 A1 | 10/2008 | Rogers et al. | |
| 2011/0215046 A1 | 9/2011 | Rogers et al. | |
| 2011/0309012 A1 | 12/2011 | Rogers et al. | |
| 2012/0210689 A1 | 8/2012 | Rogers et al. | |
| 2012/0312738 A1 | 12/2012 | Rogers et al. | |
| 2013/0008846 A1 | 1/2013 | Rogers et al. | |
| 2014/0049581 A1 * | 2/2014 | Tanaka | B41J 2/16517 347/31 |
| 2014/0197094 A1 | 7/2014 | Rogers et al. | |
| 2016/0074799 A1 * | 3/2016 | Wall | B01D 46/0023 55/385.3 |
| 2016/0076418 A1 * | 3/2016 | Wall | F01M 13/04 55/385.3 |

FOREIGN PATENT DOCUMENTS

| | | |
|---|---|---|
| DE | 20 2005 004 151 | 7/2006 |
| DE | 10 2012 217 019 | 5/2013 |
| DE | 10 2013 111 149 | 4/2014 |
| EP | 0 752 262 | 1/1997 |
| EP | 2 700 438 | 2/2014 |
| GB | 2 211 437 | 7/1989 |
| JP | 51105661 U | 8/1976 |
| JP | 52-130068 | 11/1977 |
| JP | S61107916 A | 5/1986 |
| JP | 4-37519 | 2/1992 |
| JP | H05111909 A | 5/1993 |
| JP | 06114223 A | 4/1994 |
| JP | 9-239220 | 9/1997 |
| JP | 10103039 A | 4/1998 |
| JP | 2001017812 A | 1/2001 |
| JP | 2006-204966 | 8/2006 |
| JP | 2009-524520 | 7/2009 |
| JP | 2010115567 A | 5/2010 |
| JP | 2011-47306 | 3/2011 |
| JP | 2012-92844 | 5/2012 |
| JP | 2013-94699 | 5/2013 |
| JP | 2013-193028 | 9/2013 |
| SU | 1407512 | 7/1988 |
| WO | 2008/146045 | 12/2008 |

OTHER PUBLICATIONS

Unofficial English Translation of Japanese Office Action issued in connection with corresponding JP Application No. 2015176267 dated Aug. 30, 2016.

Unofficial English Translation of Japanese Search Report issued in connection with corresponding JP Application No. 2015176267 dated Dec. 19, 2016.

Austrian Search Report dated Mar. 24, 2015 in corresponding Austrian Application No. A 50646/2014 (with English translation).

Unofficial English translation of Office Action issued in connection with corresponding JP Application No. 2015176267 dated Jul. 4, 2017.

* cited by examiner

FILTER

The invention concerns a filter for separating liquid suspended particles from a gas having the features of the preamble of claim 1 and an internal combustion engine having the features of the preamble of claim 13.

In operation of an internal combustion engine it is known that so-called blow-by gases are produced, which are to be discharged from a crankcase of the internal combustion engine to avoid a rise in the pressure in the crankcase. In closed crankcase ventilation systems that crankcase venting gas is fed back to an air intake of the internal combustion engine. The carrier gas contains fine oil droplets and solid particles of the order of magnitude of between about 0.1 μm and 10 μm.

To avoid negative effects of the oil contained in the blow-by gas on components in the air intake of the internal combustion engine it is known for oil and solid particles to be separated from the carrier gas.

Inter alia filters as set forth in the preamble of claim 1 are used for that purpose. To achieve high degrees of separation in that particle size range filter media for fine separation are frequently employed. In particular filter media are used, which are based on the principle of depth filtration and coalescence. In that case the gas to be cleaned passes through the filter medium and the particles are retained by mechanical effects in 3-dimensionally curved flow paths of the filter medium. The principle of coalescence filters is that the fine oil droplets are brought into contact at suitable surfaces so that they combine to form larger units and can flow away by way of the force of gravity and the gas flow.

In filters of the general kind set forth portions with filter media for coarse separation are usually followed by portions with filter media for fine separation.

The fine separation filter media are usually characterised by a small fiber diameter and small pore diameters. Depending on a series of filter media properties and liquid properties as well as the prevailing interface forces under usual operating conditions separated liquid is frequently not sufficiently purged from the filter medium whereby the filter medium in operation is rapidly clogged and the filter difference pressure rises.

Proposals for filters with a high degree of separation while maintaining a low counterpressure are known from the state of the art.

U.S. Pat. No. 8,277,529 describes for example a structure for a filter element, which has at least two layers of a filter medium comprising non-woven fleece, wherein the filter substrates contain various fractions of fibers of differing diameter and the filter media have various pore sizes. U.S. Pat. No. 8,360,251 describes a filter medium for coalescence filtration, wherein the filter medium has at least three adjoining layers which are arranged in series and which are so configured in respect of their porosity that the substrate with the largest porosity is disposed in the central layer.

U.S. Pat. No. 8,021,455 describes a filter element comprising at least two layers of a filter medium of non-woven material, wherein a first filter medium has various fiber fractions of differing fiber diameter and there is provided a second filter medium comprising only one fiber fraction.

U.S. Pat. No. 4,759,782 describes a coalescence filter comprising three layers, wherein the first layer has a first pore size and a fiber fraction of a first diameter, the second layer—upstream of the first layer—is of a larger pore diameter than the first layer, and a third layer which is arranged downstream and which has a pore size larger than the central layer, wherein the surface energies of each layer are greater than the surface tension of water.

DE102012217019 (A1) discloses a filter whose structure is intended to prevent rapid clogging of the filter. The filter of that specification has a layer of high density and a layer of low density, which are laminated together. The high-density layer is arranged at an upstream side in a flow direction of the gas and is formed by fibers for collecting oil or water. The low-density layer is arranged at a downstream side and is formed by fibers for draining water or oil collected by the high-density layer. The fibers of the high-density layer are each of a fiber shape which is configured to collect oil or water. The fibers of the low-density layer are each of a fiber shape configured to drain oil or water.

The object of the present invention is to improve transport and drainage of retained liquid of a filter, in comparison with the state of the art.

That object is attained by a filter having the features of claim 1. Advantageous embodiments are recited in the appendant claims.

The fact that at least one drainage layer is arranged within the filter portion for fine separation provides that transport and drainage of the caught liquid in the filter is facilitated and the filter is improved in respect of counterpressure and separation effect.

The arrangement according to the invention provides that the separated liquid is carried away from the layer for fine separation and is thus relieved of separated liquid and thus opposes a lower flow resistance to the gas to be cleaned.

Preferably it can be provided that further drainage layers are arranged upstream and/or downstream of the layer for fine separation.

According to a further preferred variant it is provided that at least one further drainage layer and/or spacing is provided between the at least one filter portion for coarse separation and the at least one filter portion for fine separation.

Alternatively or in addition to the drainage layer it is also possible to provide a spacing between filter portions for coarse separation and filter portions for fine separation. A spacing can be implemented in the filter structure for example by a procedure whereby, when winding the filter layer portions, a spacer portion, for example a layer portion of little compressibility of knitted fabric, is also wound therein.

Preferably it can be provided the filter portion for fine separation comprises a sequence of layers for fine separation and layers for fine drainage.

It can also be preferably provided that the filter portion for fine separation comprises different layers for fine separation, wherein the mean pore size of the first layer for fine separation is of a larger mean pore size than the second layer for fine separation.

Preferably it can be provided that the fiber diameter of the layers for fine separation is less than 10 μm, preferably less than 5 μm. That means that the filter media constituting the different layers for fine separation are of a mean fiber diameter of less than 5 μm. The filter media typically comprise a woven fabric, a knitted fabric or a knitted fabric of fibers.

Preferably it can be provided that the layers for fine separation have liquid-repellent surface properties. Liquid-repellent means that the material cannot be wetted by liquid or can scarcely be wetted by liquid. The liquid-repellent surface properties can either be inherent (that is to say specific to the base material) or they be ensured by a suitable treatment.

It can further be provided that a barrier layer and/or a spacing is provided between layers for fine separation and layers for fine drainage. That barrier layer or spacing is intended to prevent liquid being discharged from drainage layers to the following filter layers.

Preferably it can be provided that the drainage layers have a capillary action in relation to the liquid. The choice of the drainage material depends on the material structure and the surface tension of the liquid in relation to the filter medium. The rise height for characterising the capillary action can be easily determined by experiment. Preferably the material is such that a rise height for the liquid in the drainage layer of between 2 and 10 cm, preferably between 5 and 10 cm, is achieved.

It is preferably provided that a mean pore size of the filter material of the drainage layers is so much smaller than the mean fiber length of fibers of the filter material of the separation layers and the drainage layers are joined, preferably glued, at their ends in surface contact with end boundaries of the filter, that substantially no fibers of the filter media which are disposed upstream in the flow direction are discharged from the filter with the liquid and return of liquid drops into the gas flow is substantially prevented.

The invention can best be understood by reference to the following description of the preferred embodiments together with the accompanying drawings in which.

It should be noted at the outset that the Figures always show two layers of the same filter medium. That is not required. It can also be provided that there is only one respective layer of a respective filter medium.

Figure 1:
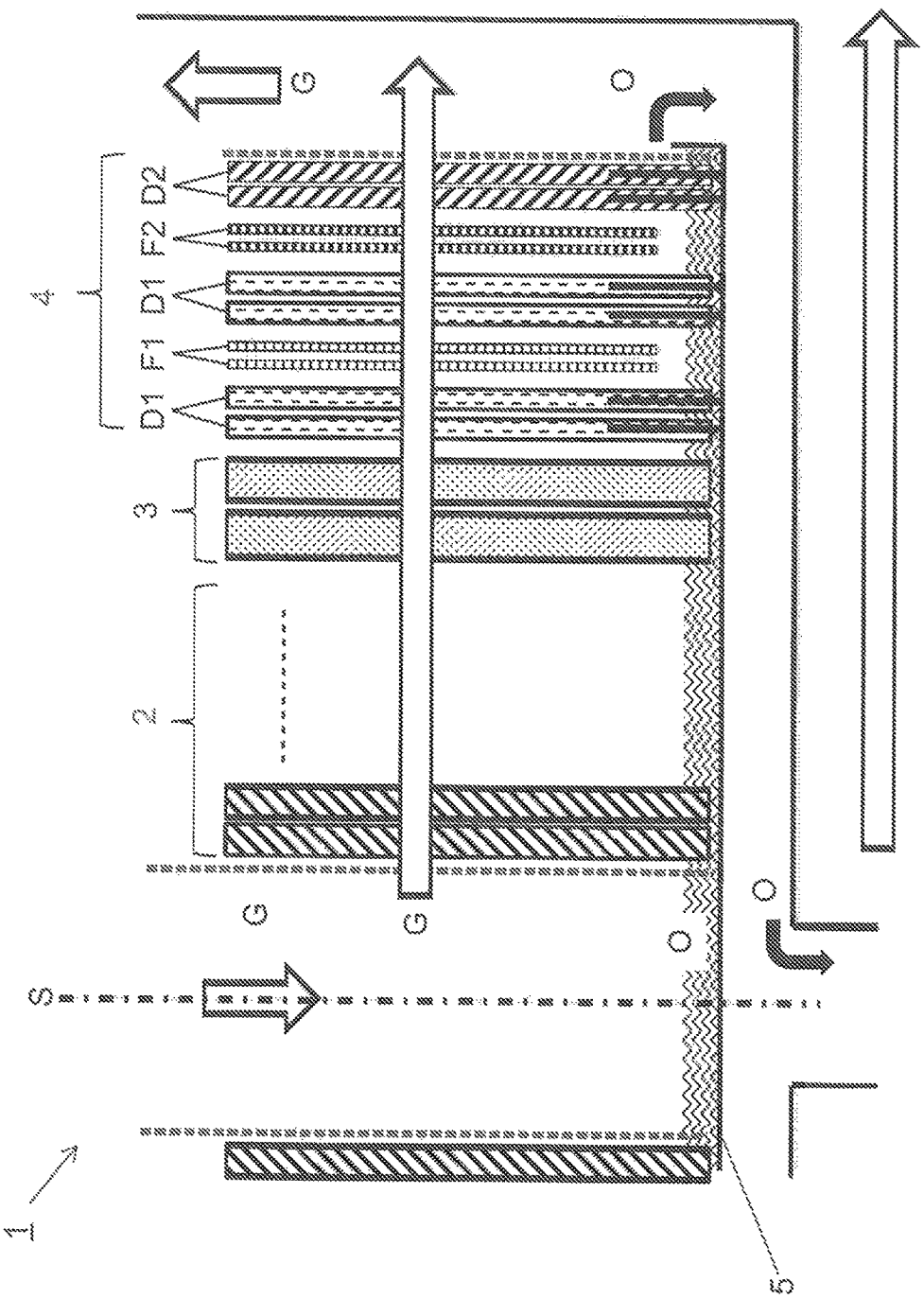
FIG. 1 shows a cross-sectional view of a filter.

The filter in FIG. 1 in the present embodiment is of a cylindrical and rotationally symmetrical configuration, therefore only one half of the cross-section will be discussed for description purposes. It will be appreciated that the filter can also be of other shapes, for example cuboidal.

The incoming flow of the liquid-charged gas G is in the center of the cylindrical structure, the center is identified by the axis of symmetry S. The flow direction of the gas G is indicated by white arrows. The gas G which is charged with liquid drops firstly flows through portion 2 for coarse separation, comprising one or more layer portions of a filter medium for coarse separation. For the sake of clarity the drawing only shows two layer portions, the dots in section 2 indicate that there can be still further layer portions.

The purpose of the portion 2 for coarse separation is to reduce the mass of liquid entrained by the gas G before it passes into the following filter layers. The portion 2 for coarse separation is followed by a layer 3 for coarse drainage. The layer for coarse drainage prevents liquid which has already been separated out from being discharged into the following layer. Alternatively or additionally a spacing can be implemented between filter portions for coarse separation and filter portions for fine separation.

Subsequently the gas G passes through a sequence of layers of filter material D1 for fine drainage and layers of filter material F1, F2 for fine separation. The layers D1 for fine drainage absorb separated liquid O from the layers for fine separation F1, F2 and transport same by way of the force of gravity to the liquid discharge at the bottom of the filter 1. The discharge flow of the liquid O is indicated by black arrows. The filter 1 includes end boundaries 5. Only the lower end boundary 5, that is to say the bottom, is shown in FIG. 1. Generally the filter 1 also includes an upper end boundary 5, which can be referred to as a cover. At least the drainage layers of the filter 1 are joined, preferably glued, at their ends in surface contact with end boundaries 5 of the filter 1.

Downstream, that is to say shown at the right in this Figure, the filter 1 is delimited by a layer of filter material D2 for drainage and containment. That layer drains liquid O from the last region, that is therefore disposed downstream, of the layer for fine separation. The layer of filter material D2 for drainage and containment reduces the volume of liquid in the last layer of filter material F2 for fine separation and the flow speed of the gas G in order thereby to prevent liquid from passing back into the gas G again. In addition the layer D2 for drainage and containment encloses the layer F2 for fine separation in such a way that no fibers of the upstream-disposed media can be discharged with the separated liquid.

The number of layer portions D1, D2, F1, F2 in each portion is at least 1. As combinations of the portions, it can be provided that D1 and F1 portions can be repeated alternately, in which case the arrangement is concluded downstream with a respective layer D1. That gives a sequence of $(D1+F1)_n+D1$ with n as the number of repetitions of the combination (D1+F1), with $n \geq 1$.

The combination of the portions formed from D1, D2 and F1, F2 can be formed by one or more repetitions of the arrangement $(D1+F1)_n+(D1+F2)_m+D2$, with m as the number of repetitions of the combination (D1+F2), with $m \geq 1$.

In addition a barrier layer B (not shown) can be provided after, that is to say downstream of, each drainage layer D1. That barrier layer is intended to prevent liquid being further carried from drainage layers to the following filter layers. The medium of the barrier layer can either be a liquid-repellent material or a liquid-repellently coated material or a free space between the layers. In that case the sequence is therefore D1+F1+D1+B+F1.

The following are considered as suitable filter media:
for the layers F1 and F2: for example glass fiber material with a mean fiber diameter of less than 5 μm, D1 and D2: for example polyester, polyolefin or glass fiber material with a fiber diameter of greater than 10 μm and porosities of greater than 90%, the pore diameter of the layer F1 is for example between 100 and 30 μm and is greater than the pore diameter of the layer F2 of for example between 5 and 10 μm, the layers F1 and F2 for fine separation are liquid-repellent or have a liquid-repellent surface treatment, and the drainage materials D1 and D2 have a capillary action which leads at least to a rise height of the liquid of between 20 and 50 mm.

Figure 2:
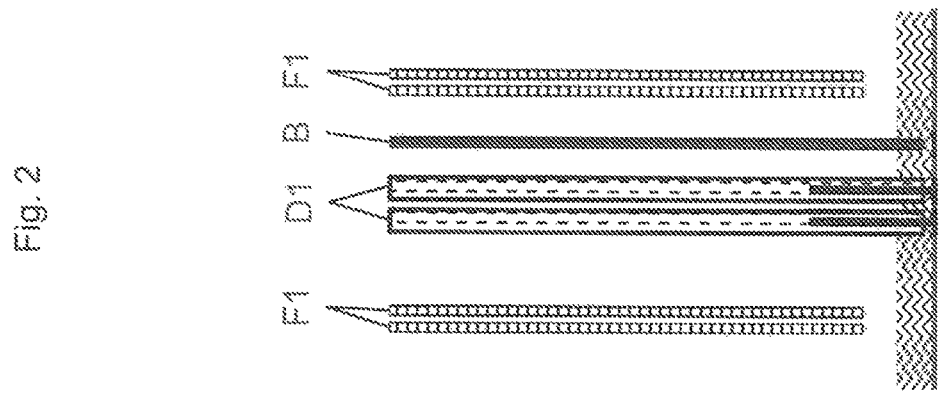
FIG. 2 shows a detail view of a filter.

FIG. 2 shows a portion of the filter portion 5 for fine separation, wherein in this embodiment a barrier layer B is provided after, that is to say downstream of, each drainage layer D1. That barrier layer B is intended to prevent liquid from being carried from drainage layers to the following filter layers. The medium of the barrier layer can either be a liquid-repellent material or a liquid-repellently coated material or a free space between the layers. In this case therefore the sequence is F1+D1+B+F1.

In regard to all views spacings are shown between the individual filter layer portions, for the sake of clarity. In practice the filter layer portions are closely packed or wound. In addition the Figures each show two layer portions of the respective filter material. The actual number of layer portions can vary in practice.

Figure 3:
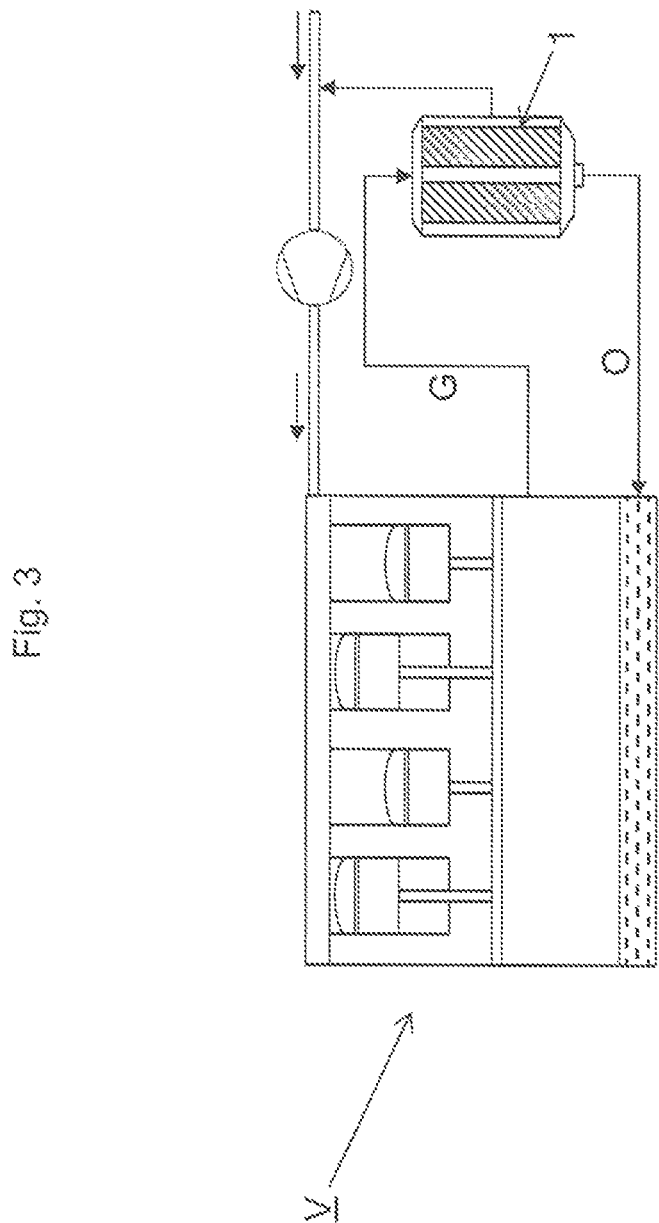
FIG. 3 shows a diagrammatic view of the arrangement of a filter device on an internal combustion engine.

FIG. 3 shows an internal combustion engine V having a filter 1. In this case the filter 1 is used as a filter for oil separation in the crankcase ventilation system (blow-by filter).

| List of references used: | |
|---|---|
| 1 | filter |
| 2 | filter portion for coarse separation |
| 3 | layer for coarse drainage |
| 4 | filter portion for fine separation |
| 5 | end boundary |
| D1 | filter material for fine drainage |
| F1 | first filter material for fine separation |
| F2 | second filter material for fine separation |
| D2 | filter material for drainage and containment |
| B | barrier layer |
| G | gas |
| O | liquid |
| S | axis of symmetry |
| V | internal combustion engine |

The invention claimed is:

1. A filter for separating liquid suspended particles from a gas, the filter comprising:
   at least one filter portion for coarse separation;
   at least one filter portion for fine separation; and
   at least one drainage layer having a capillary action in relation to a liquid comprising separated liquid suspended particles for a rise height of the liquid in the at least one drainage layer by the capillary action between 2 and 10 cm, arranged within the at least one filter portion for fine separation.

2. The filter as set forth in claim 1, wherein at least one further drainage layer or spacing is arranged between the at least one filter portion for coarse separation and the at least one filter portion for fine separation.

3. The filter as set forth in claim 1, wherein the at least one filter portion for fine separation comprises a sequence of layers for fine separation and layers for fine drainage.

4. The filter as set forth in claim 3, wherein the sequence of layers for fine separation and layers for fine drainage is defined as (D1+F1)n+D1, with D1 representing layers for fine drainage, F1 representing layers for fine separation, and n representing a number of repetitions of a (D1+F1) combination, with n≥1, wherein each of the layers for fine separation comprises one or more layer portions of a filter material for fine separation and each of the layers for fine drainage comprises one or more layer portions of a filter material for fine drainage.

5. The filter as set forth in claim 3, wherein the sequence of layers for fine separation and layers for fine drainage is defined as (D1+F1)n+(D1+F2)m+D2, with D1 representing layers for fine drainage, F1 representing layers for fine separation, n representing a number of repetitions of a (D1+F1) combination, with n≥1, F2 representing layers of filter material for fine separation, m representing a number of repetitions of a (D1+F2) combination, with m≥1, and D2 representing layers of filter material for drainage and containment, wherein each of the layers for fine separation comprises one or more layer portions of a filter material for fine separation and each of the layers for fine drainage comprises one or more layer portions of a filter material for fine drainage.

6. The filter as set forth in claim 1, wherein the filter portion for fine separation comprises differing layers for fine separation, wherein a first mean pore size of a first layer for fine separation is larger than a second mean pore size of a second layer for fine separation.

7. The filter as set forth in claim 3, wherein the layers for fine separation comprise fibers with diameters less than 10 µm.

8. The filter as set forth in claim 3, wherein the layers for fine separation have liquid-repellent surface properties or a liquid-repellent surface coating.

9. The filter as set forth in claim 3, wherein a barrier layer or a spacing is provided between the layers for fine separation and the layers for fine drainage.

10. The filter as set forth in claim 1, wherein the rise height of the liquid in the at least one drainage layer by the capillary action is between 5 and 10 cm.

11. The filter as set forth in claim 3, wherein ends of fibers of filter material of the layers for fine separation and the layers for fine drainage are joined in surface contact with end boundaries of the filter, with no fibers of the filter material discharged of liquid comprising the separated liquid suspended particles, thus preventing a return of the separated liquid suspended particles into the gas.

12. The filter as set forth in claim 1, wherein the separated liquid suspended particles are oil.

13. An internal combustion engine comprising the filter as set forth in claim 1.

* * * * *